United States Patent [19]
Anderson

[11] Patent Number: 5,586,781
[45] Date of Patent: Dec. 24, 1996

[54] VARIABLE RIDE HEIGHT VEHICLE SUSPENSION SYSTEM

[76] Inventor: Colin J. Anderson, Reservoir Cottage, Gargate Hill Aldershot, Hants GU11 3AA, Great Britain

[21] Appl. No.: 432,150

[22] PCT Filed: Oct. 27, 1993

[86] PCT No.: PCT/GB93/02216

§ 371 Date: May 5, 1995

§ 102(e) Date: May 5, 1995

[87] PCT Pub. No.: WO94/11211

PCT Pub. Date: May 26, 1994

[30] Foreign Application Priority Data

Nov. 7, 1992 [GB] United Kingdom .................... 9223414

[51] Int. Cl.$^6$ ..................................... B60G 11/26
[52] U.S. Cl. ................... 280/708; 280/714; 267/64.17
[58] Field of Search .................. 280/708, 709, 280/702, 714, 840, 6.12, DIG. 1; 267/64.17, DIG. 2; 188/314

[56] References Cited

U.S. PATENT DOCUMENTS

| | | | |
|---|---|---|---|
| 2,879,057 | 3/1959 | Heiss | 280/6.12 |
| 3,083,026 | 3/1963 | Broadwell | 267/64.17 |
| 3,610,656 | 10/1971 | Klees | 280/709 |
| 3,623,746 | 11/1971 | Zielinski | 280/710 |
| 4,159,106 | 6/1979 | Nyman | 188/314 |
| 4,743,000 | 5/1988 | Karnopp | 267/218 |
| 4,815,751 | 3/1989 | Tuczek | 280/714 |

FOREIGN PATENT DOCUMENTS

| | | |
|---|---|---|
| 0197317 | 10/1986 | European Pat. Off. . |
| 0331175 | 9/1989 | European Pat. Off. . |
| 0351537 | 1/1990 | European Pat. Off. . |
| 1480197 | 5/1969 | Germany . |
| 1430668 | 9/1969 | Germany . |
| 2038821 | 4/1972 | Germany . |
| 3-197228 | 8/1991 | Japan ............... 267/DIG. 2 |
| 1128092 | 9/1968 | United Kingdom . |

*Primary Examiner*—Paul N. Dickson
*Attorney, Agent, or Firm*—Walter C. Farley

[57] ABSTRACT

A variable ride height vehicle suspension system in which the energy input is from ground impact includes a telescopic hydropneumatic strut with a liquid chamber separated from a gas chamber by a free piston. A reservoir external of the strut is connected to one of the chambers via a valve arrangement also external of the chambers. The valve arrangement is selectively operable to permit unidirectional fluid flow in one or the other direction between the reservoir and the strut chamber to which it is connected, the flow direction being selected to enable lengthening or shortening of the strut in response to pressure oscillations in the gas chamber.

4 Claims, 3 Drawing Sheets

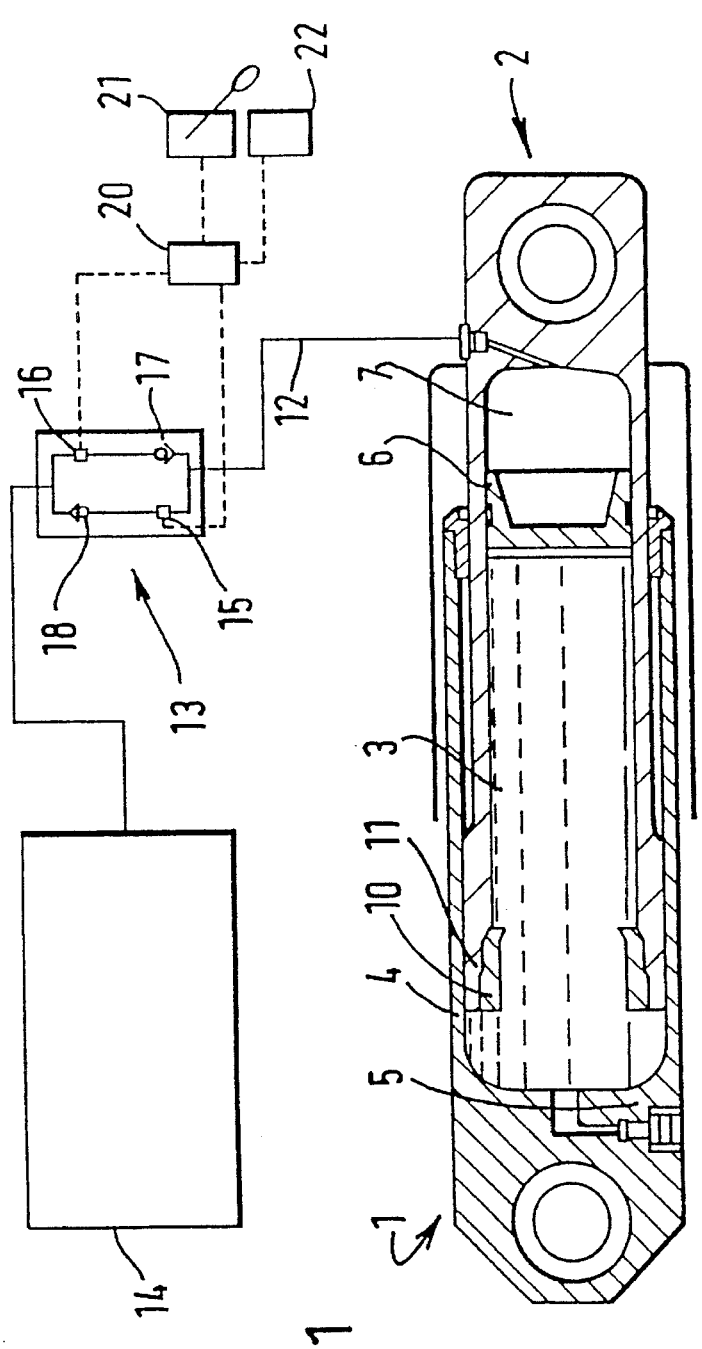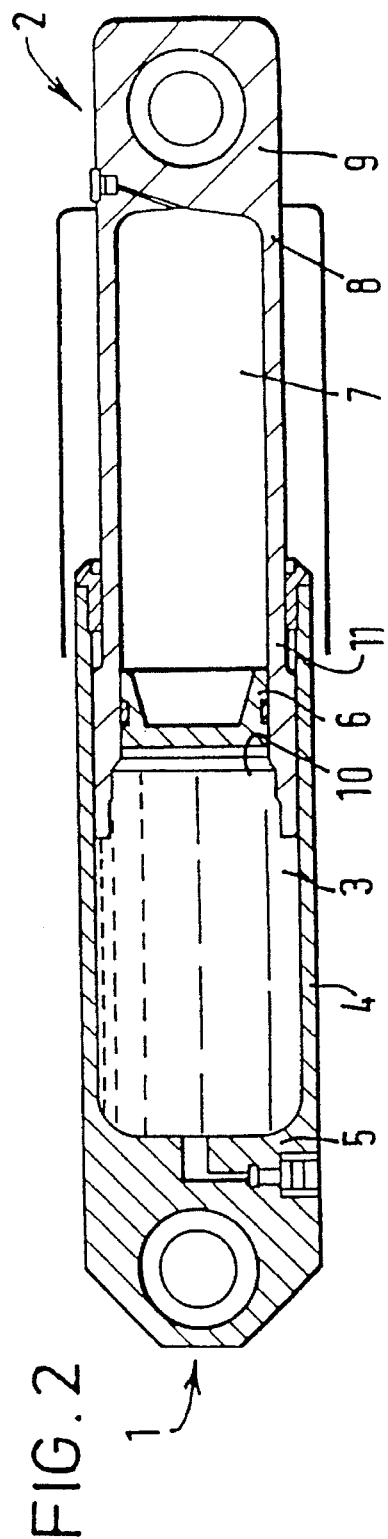

5,586,781

VARIABLE RIDE HEIGHT VEHICLE SUSPENSION SYSTEM

FIELD OF THE INVENTION

This invention relates to height adjustment mechanisms for vehicles. It has particular relevance to hydropneumatic suspensions.

BACKGROUND OF THE INVENTION

In hydropneumatic suspension systems a typical arrangement comprises a piston connected to a wheel or other ground engaging part such as a caterpillar track. The piston extends into a liquid chamber and forces the liquid from that chamber through a damping restrictor into a second chamber. A floating piston or flexible membrane separates the second chamber from a closed gas chamber so that liquid entering the second chamber compresses the gas to provide the spring in the suspension. In alternative arrangements a dashpot replaces the restricted passage between liquid chambers.

There are various limitations to such a system. One problem, which has been addressed, is the change in height with loading due to compression of the gas, and systems have been proposed to retain constant height by varying the mass of gas in the chamber. However, existing proposals require either a source of compressed gas and a venting means, the gas chamber then no longer being closed, such as described in U.S. Pat. No. 4,408,773, or a two-part gas chamber with connecting valve and a hydraulic pumping arrangement to cause transfer of gas between the two chambers effectively to change the mass of gas in the part of the chamber forming the spring. This latter arrangement is shown in UK specification 1602291.

These two specifications concern retaining constant height of chassis. On the other hand there are also instances when it is desired to adjust chassis height, irrespective of load, for example to enable vehicles to travel over different types of terrain, to vary the utilisation mode of the vehicle or to suit the speed of travel. Height adjustments such as raising the height of the chassis require significant energy input to raise the mass of the vehicle. Various 'active' suspension systems have been designed in which this energy is provided through hydraulic, pneumatic or electrical servo mechanisms.

Such active suspension systems involving an external source of energy draw on the energy resources of the vehicle, thus leading to reduced fuel efficiency, extra weight and design complexity.

There are proposals for adjusting ride height that harness the very considerable energy generated within the suspension system from ground surface impacts and wheel patter. This energy, when not used, is normally dispersed as heat, for example in the damping element ,of the suspension system. However, the systems using this ground generated energy have been centred on the hydraulic part of hydropneumatic systems and still suffer from design complexity.

UK specification 1128092 shows an arrangement in which valves in a ported piston separating two hydraulic chambers are arranged to permit fluid flow from one chamber to another when the piston oscillates as a result of ground impact. A staggered porting arrangement for the valves provides differential transfer between the chambers when the piston oscillates about a position displaced from a predetermined mean, such as occurs when load is increased. As a result of the differential transfer the piston and the chassis height are restored to the predetermined mean. Such an arrangement provides automatic ride height adjustment, utilising ground impact energy, but does not provide selectable, variable ride height during vehicle motion.

SUMMARY OF THE INVENTION

The present invention is directed towards providing variable ride height, which may also be utilised to retain constant height for variable load (i.e. self-levelling), where the energy input is from ground impact and is simple in function, reliable and cheap to manufacture.

Accordingly the invention provides a hydropneumatic suspension system for a vehicle comprising a chassis and ground engaging parts in which energy from ground impact of ground engaging parts is utilised to adjust the height of the chassis relative to the ground engaging parts, the arrangement comprising a fluid chamber subject to bump and rebound pressures and having valved interconnections to a second chamber enabling flow of fluid between the chambers to provide the adjustment to the height of the chassis characterised in that the second chamber is an auxiliary chamber not supporting the chassis and the valves are remotely operable selectively to raise or lower the chassis by permitting fluid flow respectively under bump or rebound pressures.

The invention also provides a telescopic hydropneumatic strut comprising a liquid chamber separated from a gas chamber by a free piston, a reservoir external of the strut connected to one of said chambers via a valve arrangement carried externally of the chambers, the valve arrangement being selectively operable to permit unidirectional fluid flow in one or other direction between the reservoir and the strut chamber to which it is connected, the flow direction being selected to enable lengthening or shortening of the strut resulting from pressure oscillations in the gas chamber.

BRIEF DESCRIPTION OF THE DRAWINGS

The invention is now described by way of example with reference to the accompanying drawings in which:

FIG. 1 is a schematic diagram of a strut assembly incorporating a preferred embodiment of the invention, showing the strut in the bump position;

FIG. 2 is the schematic diagram showing the strut of FIG. 1 in the rebound position;

DESCRIPTION OF THE PREFERRED EMBODIMENTS

Figure 3:
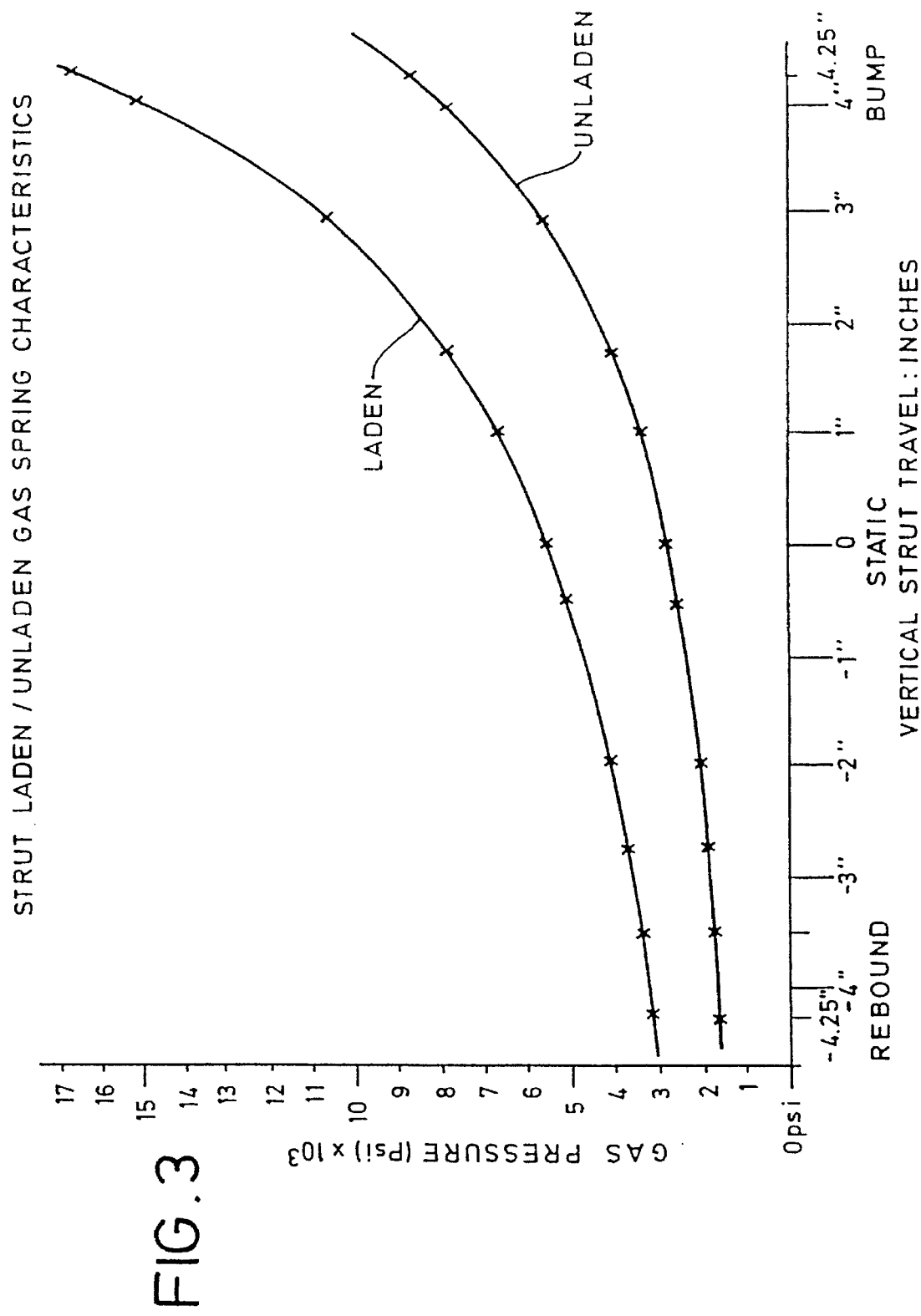
FIG. 3 shows gas spring characteristics for gas pressure versus strut travel.

FIG. 1 shows a hydropneumatic strut of a type suitable for attachment at one end 1 to a wheel (not shown) or other ground engaging mechanism. The other end 2 of the strut is adapted for connection to a vehicle chassis (not shown) in such a manner that vehicle loads are transmitted via the strut to the wheel or other ground engaging part.

The strut comprises an oil chamber 3 defined by cylindrical wall 4 and end 5 which can be seen more clearly in FIG. 2. A floating piston 6, which may alternatively be replaced by a flexible membrane, separates the oil chamber 3 from a gas chamber 7. The gas chamber is defined by cylindrical wall 8 and end 9, again more clearly shown in FIG. 2.

A damper 10 is carried by the end 11 of the cylindrical wall 8 remote from the end 9, the damper being located within the oil chamber and the end 11 of the cylindrical wall 8 being a sliding fit within the cylindrical wall 4 of the oil chamber 3. It will be appreciated that the arrangement may be varied, the strut essentially comprising a telescopic arrangement with relatively sliding parts and a floating piston or flexible member defining a hydraulic and pneumatic chamber.

It will be seen from FIG. 1 that when the strut is in the retracted configuration which occurs when the ground imparts a 'bump' the relative motion causes the damper 10 and end 11 of tube 8 to be pushed into the oil chamber. (The motion is perhaps more properly described as the oil chamber pushing on to the damper). The oil passes through the damper 10 which is cylindrical or suitably apertured and into the narrower cylinder now defined by the end 11 of the gas cylinder 8, simultaneously compressing the gas by movement of the floating piston 6. This particular damping arrangement may be modified, or damping provided within the gas chamber, without departing from the operational aspect of the invention which is now described.

A connection 12 links the main gas cylinder 7 via a valve assembly 13 to an auxiliary gas cylinder 14. The valve assembly 13 comprises two pilot or solenoid operated shut off valves 15 and 16, and two non-return valves 17 and 18. This valve arrangement is by way of example but others which give the same effect may be used. Both the auxiliary gas cylinder and the valve assembly maybe chassis mounted on top of the strut or mounted near to it. In the latter case the connection 12 would be a flexible hose. For protection purposes they may beth be armoured.

A control box 20 provides operating signals to the shut-off valves 15 and 16 and may itself be supplied with information from a manual control unit 21 mounted in an operator or driver console or from a microprocessor unit 22 which commutes commands based on input information such as actual ride height, payload and/or predetermined ride height requirements. Each strut unit on a vehicle normally has its own valve assembly and auxiliary gas cylinder in order to establish its independence from other strut units. This is particularly important for military vehicles so that battle damage does not cause a total suspension system failure. Non-military vehicles may have a centralised auxiliary gas cylinder with either centralised or individual valve units.

Considering the situation when the strut is set for low ride height, at this stage the strut, relatively speaking, is telescoped together (closer to the mean height position which is half way between bump and rebound positions as shown in FIGS. 1 and 2) and the volume of the main gas cylinder 7 is at its static minimum. By static minimum is meant the minimum rest configuration, a lower or smaller minimum occurs on bump. The charge pressure of the gas in the auxiliary gas cylinder 14, in this configuration, is selected to be approximately equal to the pressure that is experienced in the main gas cylinder 7 when ground impact causes a rise in the wheels, transmitted via the oil cylinder as a compression of cylinder 7. This pressure, as occurs in the position shown in FIG. 2, is known as the bump pressure.

When it is required to increase the ride height of the vehicle, valve 15 is opened and valve 16 closed thus enabling flow from the auxiliary gas cylinder 14 into the main cylinder 7. On changing to this valve setting there is an initial flow of gas into the main gas cylinder because of the greater pressure in the auxiliary cylinder. This initial flow, until the pressures have equalised, causes an initial rise in the ride height. Non-return valve 18 prevents gas being forced back into the auxiliary cylinder in the event of a bump, thus essentially retaining the closed nature of the main cylinder for gas spring purposes.

If no further increase in height is required valve 15 is closed. Should further height be required valve 15 is kept open. Then as the vehicle manoeuvres and the wheels encounter roughness they rise and then rebound. On the rebound the strut extends causing the gas in the cylinder 7 to expand further thus reducing its pressure below the original value. The reduction in pressure in the main gas cylinder 7 caused by the rebound brings its pressure below that of the auxiliary cylinder 14 and so further gas transfers into the main cylinder. On contraction after the rebound non return valve 18 prevents flow back to the auxiliary cylinder 14. Incremental height increases are thereby achieved with each rebound either until the desired height is reached and valve 15 closed or until maximum height is reached when the pressure in the auxiliary cylinder 14 has fallen to the same level as the rebound pressure of the main cylinder thereby preventing any further transfer. FIG. 2 shows the strut fully extended in the 'rebound' position.

When it is desired to reduce the ride height, valve 15 is closed and valve 16 is opened. If the lowering is from the maximum height then on opening the valve 15 the initial pressure in the auxiliary cylinder 14 is at rebound pressure and lower than that of the main cylinder 7 so that gas transfers from the main cylinder 7 to the auxiliary cylinder 14, leading to an initial reduction in height, until the pressures have equalised. Non return valve 17 prevents gas flowing in the reverse direction from auxiliary cylinder to main cylinder.

Now as the vehicle manoeuvres, wheel rise causes compression of the main gas cylinder 7, with the pressure rising to bump pressure, so that gas continues to transfer with each bump into the auxiliary cylinder 14 either until valve 7 is closed at the desired height or when the auxiliary cylinder reaches bump pressure at the minimum ride height. On rebound after bumps and between bumps valve 17 prevents reverse flow back to the main gas cylinder 7.

The above description has been in terms of variable ride height. More fundamentally the invention may be described as actuation of the effective length or volume of a strut, utilising pressure oscillations. It will be realised that increasing the load leads to a reduction in ride height and valve settings to increase height to a specific level may be used to maintain a given height under a variable load.

Monitoring pressure in the auxiliary chamber (and hence in the strut) may be used to provide a height reading for a given load. This could be achieved using a three way valve and a pressure transducer with a controller unit inside the vehicle.

FIG. 3 illustrates the extreme characteristic curves for maximum and minimum loads of a typical strut design.

Figure 4:
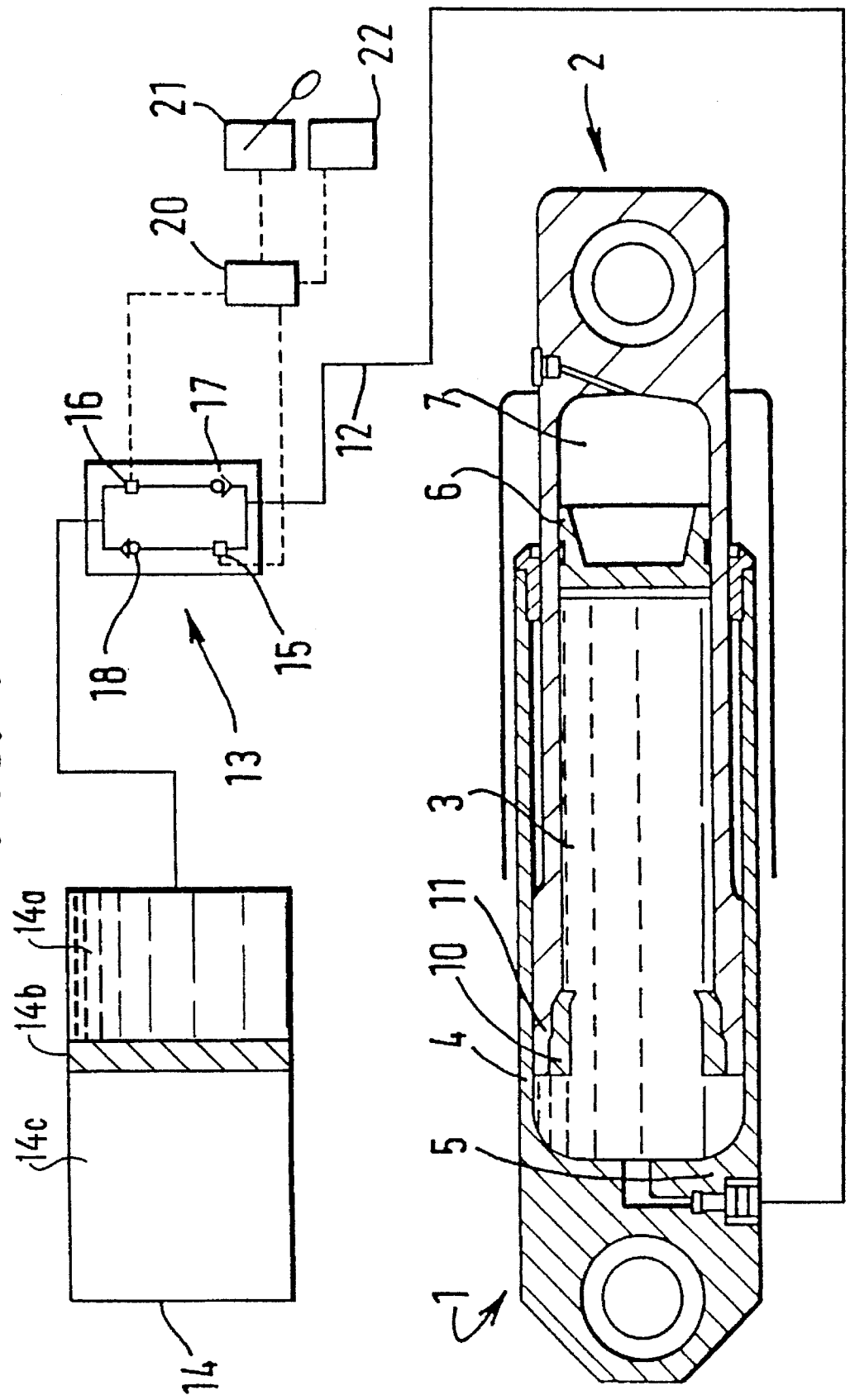
FIG. 4 is a schematic side elevation, in section, of a further embodiment of a strut assembly in accordance with the invention.

A similar mechanism may be used on the hydraulic side of a hydropneumatic system. In this instance as shown in FIG. 4 the hose line extends from the oil cylinder 3 (which now constitutes the main cylinder) and the auxiliary cylinder 14 comprises an oil cylinder 14a with a floating piston 14b separating it from an enclosed gas chamber 14c that provides volume and pressure adjustment. To lower the chassis, on bumping oil transfers to the auxiliary cylinder via a similar valve arrangement 13 as before and the gas part 14c of the auxiliary chamber compresses until bump pressure is reached. Conversely, to increase height on rebound, fluid transfers to the cylinder 3 and the gas part of the auxiliary cylinder expands until rebound pressure is reached.

We claim:

1. A hydropneumatic system comprising:
   (I) a telescopic strut including
      (A) a first chamber including first and second mutually telescopically movable wall parts, said first chamber containing hydraulic fluid;
      (B) a second chamber containing pneumatic fluid; and
      (C) a free piston means dividing said first chamber from said second chamber;
   (II) an auxiliary chamber containing pneumatic fluid; and
   (III) selectively operable valve means connecting said auxiliary chamber and said second chamber, said valve means comprising first valve means for allowing unidirectional flow of pneumatic fluid from said auxiliary chamber to said second chamber and second valve means for allowing unidirectional flow of pneumatic fluid from said second chamber to said auxiliary chamber.

2. A hydropneumatic system comprising:
   (I) a telescopic strut including
      (A) a first chamber including first and second mutually telescopically movable wall parts, said first chamber containing hydraulic fluid;
      (B) a second chamber containing pneumatic fluid;
      (C) a free piston means dividing said first chamber from said second chamber; and
      (D) first and second ends separated by said first and second chambers;
   (II) an auxiliary chamber containing pneumatic fluid; and
   (III) selectively operable valve means connecting said auxiliary chamber and said second chamber, said valve means comprising first valve means for allowing unidirectional flow of pneumatic fluid from said auxiliary chamber to said second chamber in response to a higher pneumatic pressure in said auxiliary chamber than in said second chamber and second valve means for allowing unidirectional flow of pneumatic fluid from said second chamber to said auxiliary chamber in response to a higher pneumatic pressure in said second chamber than in said auxiliary chamber, said unidirectional flow of pneumatic fluid to said second chamber causing increase in separation of said first and second ends, said unidirectional flow of pneumatic fluid to said auxiliary chamber allowing decrease in the separation of said first and second ends.

3. A hydropneumatic system comprising:
   (I) a telescopic strut including
      (A) a first chamber including first and second mutually telescopically movable wall parts, said first chamber containing hydraulic fluid;
      (B) a second chamber containing pneumatic fluid; and
      (C) a free piston means dividing said first chamber from said second chamber;
   (II) an auxiliary cylinder comprising a hydraulic chamber, a gas chamber and a floating piston separating said hydraulic chamber from said gas chamber; and
   (III) selectively operable valve means connecting said hydraulic chamber and said first chamber, said valve means comprising first valve means for allowing unidirectional flow of hydraulic fluid from said hydraulic chamber to said first chamber in response to a higher pneumatic pressure in said gas chamber and second valve means for allowing unidirectional flow of hydraulic fluid from said hydraulic chamber to said auxiliary chamber.

4. A hydropneumatic system comprising:
   (I) a telescopic strut including
      (A) a first chamber including first and second mutually telescopically movable wall parts, said first chamber containing hydraulic fluid;
      (B) a second chamber containing pneumatic fluid;
      (C) a free piston means dividing said first chamber from said second chamber; and
      (D) first and second ends separated by said first and second chambers;
   (II) an auxiliary cylinder comprising a hydraulic chamber, a gas chamber and a floating piston separating said hydraulic chamber from said gas chamber; and
   (III) selectively operable valve means connecting said hydraulic chamber and said first chamber, said valve means comprising first valve means for allowing unidirectional flow of hydraulic fluid from said hydraulic chamber to said first chamber in response to a higher pneumatic pressure in said gas chamber than in said second chamber, and second valve means for allowing unidirectional flow of hydraulic fluid from said hydraulic chamber to said auxiliary chamber in response to a higher pneumatic pressure in said first chamber than in said gas chamber, said unidirectional flow of hydraulic fluid to said first chamber causing increase in separation of said first and second ends, said unidirectional flow of pneumatic fluid to said auxiliary chamber allowing a decrease in the separation of said first and second ends.

* * * * *